United States Patent [19]

Fujita et al.

[11] Patent Number: 4,501,475
[45] Date of Patent: Feb. 26, 1985

[54] ZOOM LENS

[75] Inventors: Hisao Fujita, Hachioji; Shozo Ishiyama, Hino, both of Japan

[73] Assignee: Konishiroku Photo Industry Co., Ltd., Tokyo, Japan

[21] Appl. No.: 381,311

[22] Filed: May 24, 1982

[30] Foreign Application Priority Data

May 25, 1981 [JP] Japan .................................. 56-77935
May 25, 1981 [JP] Japan .................................. 56-78658

[51] Int. Cl.³ .................................................. G02B 7/04
[52] U.S. Cl. ........................................ 350/427; 350/423
[58] Field of Search ...................... 350/427, 469, 456

[56] References Cited
U.S. PATENT DOCUMENTS 4,299,454 11/1981 Betensky ................... 350/427

Primary Examiner—John K. Corbin
Assistant Examiner—P. M. Dzierzynski
Attorney, Agent, or Firm—Jordan B. Bierman

[57] ABSTRACT

The present invention relates to a zoom lens system having a new structure for use with still cameras, which is wide magnification-variable and compact whose zoom ratio is about three times.

A positive third lens group of a conventional zoom lens comprising three lens group, i.e. positive, negative and positive is divided into two positive lens groups to thereby decrease the refractive power of each lens group and an airspace therebetween being increased and decreased, whereby enhancing the effect of magnification-variation or rendering it possible to be utilized for correction of aberration.

Further, a positive lens group having a weak refractive power is arranged between image planes to effect correction of aberration. As a result, there is obtained a zoom lens system having a new arrangement of refractive power in order of positive, negative, positive, positive and positive.

9 Claims, 15 Drawing Figures

FIG. 3
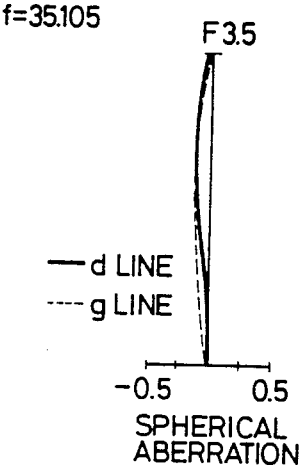
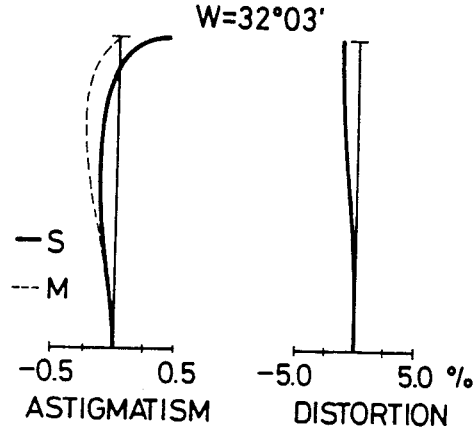
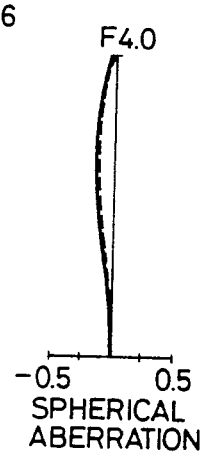
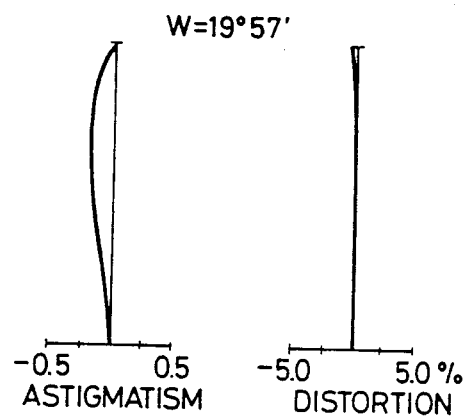
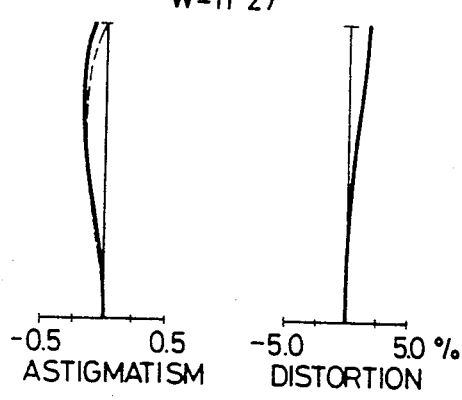

FIG. 6
f=35.098
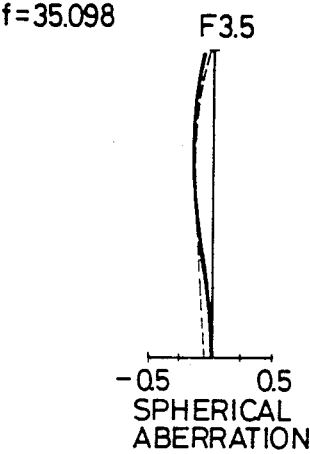
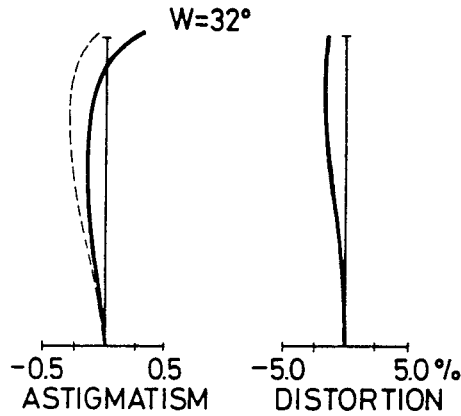
f=59.663
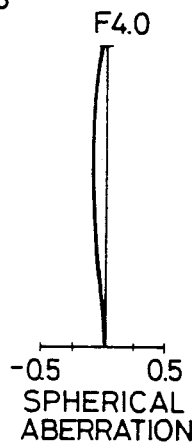
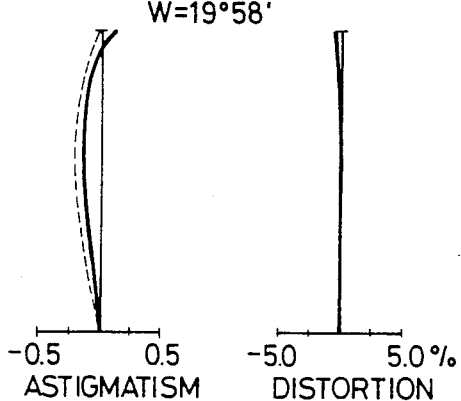
f=104.993
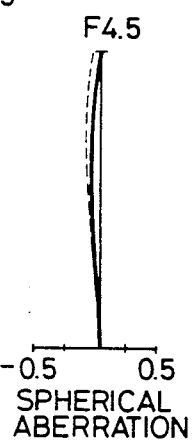
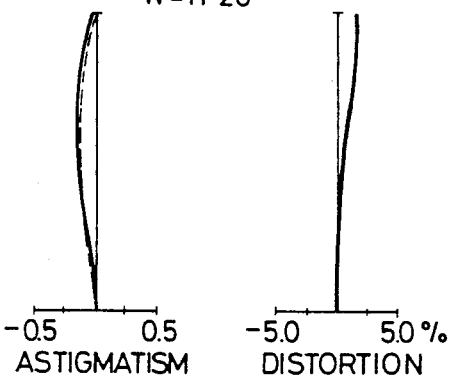

ZOOM LENS

BACKGROUND OF THE INVENTION

1. Field of the Invention

This invention relates to a compact zoom lens system for so-called still cameras, which zoom ratio is about three times from the wide angle to the sub-long focal length.

2. Description of the Prior Art

Recently, zoom lens systems which are wide magnification variable and compact and have a high performance, are in high demand, for use with still cameras.

With this, new type zoom lens systems have been groped in an attempt to break the limitation encountered in so-called mechanically-corrected or optically-corrected type zoom lens systems heretofore developed. In the past, several types of zoom lens systems have been proposed as wide magnification-variable zoom lens systems of the type as described, one of which is a zoom lens system composed of three lens groups having a refractive power arrangement of positive, negative and positive. This lens system has a barrel which is relatively simple in construction, but if an attempt is made to increase the ratio of magnification while the system remains to be compact, the refractive power of each lens group must be intensified, resulting in a difficulty in correcting aberration.

SUMMARY OF THE INVENTION

In accordance with the present invention, in the above-described zoom lens system composed of three lens groups, i.e. positive, negative and positive, the third positive lens group is divided into two positive lens groups to thereby decrease the refractive power of each lens group and to increase and decrease an airspace therebetween, thus giving rise to a magnification effect and increasing the magnification ratio of the zoom lens, the airspace between the positive lens being utilized for aberration correction. That is, the zoom lens is composed of four lens groups, which have positive, negative, positive and positive focal lengths, respectively, and when zooming is carried out, at least three lens groups among them are moved.

As a result, there was realized a wide magnification-variable, compact and high performance zoom lens system having an arrangement of refractive power of positive, negative, positive and positive heretofore unavailable.

More specifically, the present invention provides a compact zoom lens system comprising a first lens group having a positive focal length, a second lens group having a negative focal length, a third lens group having a positive focal length and a fourth lens group similarly having a positive focal length in the order from the object side, wherein a partial system consisting of the first lens group and the second lens group has a negative resultant focal length over the entire range of zooming, and when zooming is carried out from the wide position to the tele position, the first lens group and the fourth lens group are moved towards the object, the second lens group is moved towards the image, and the third lens group is fixed or slightly moved so that an airspace formed between the third lens group and the second lens group is decreased and an airspace formed between the third lens group and the fourth lens group is also decreased, said lens system satisfying the following conditions:

$$0.4f_w < t_{1,2T} < 1.5f_w \quad (1)$$

$$0.4f_w < t_{2,3w} < 1.5f_w \quad (2)$$

$$0.4f_w < |f_2| < 1.5f_w,\ f_2 < 0 \quad (3)$$

$$0.3 < K_{4(f)} < 3 \quad (4)$$

$$0.15f_w < t_{3,4w} < 1.0f_w \quad (9)$$

where
- $f$: focal length as a whole at a suitable zooming position
- $f_w$: f at the wide position
- $f_T$: f at the tele position
- $f_i$: focal length of the i lens group
- $X_i(f)$: amount of movement of the i lens group where focal length is f with the side position as a reference; movement towards the object being positive, movement towards the image being negative
- $K_i(f)$: coefficient indicative of the ratio of amount of movement of the i lens group at the focal length f to the amount of movement $X_1(f)$ of the first lens group, $K_i(f) = X_i(f)/X_1(f)$
- $t_{1,2T}$: airspace between the first and second lens groups at the tele position
- $t_{2,3w}$: airspace between the second and third lens groups at the wide position, and
- $t_{3,4w}$: airspace between the third and fourth lens groups at the wide position.

Model arrangement and moving locus of the zoom lens system are shown in FIG. 1. In view of aberration correction, it is desirable that the lens arrangement at the wide position is of the retrofocus type whereas that at the tele position is of the telephoto type. Therefore, at the wide position, an airspace between the first lens group and the second lens group is small, a resultant focal distance in this partial system is negative, a resultant focal distance of a partial lens system composed of the third and fourth lens systems is positive, and an airspace between both positive and negative partial systems is taken wide. On the other hand, at the tele position, it is required that the airspace between the first and second lens groups is wide and the airspace between the second and third lens groups is small.

The above-described conditions specifically set forth the foregoing.

The condition (1) is provided to greatly contribute the partial system comprising the first and second lens groups to the zoom ratio. To realize the high magnification variation ratio exceeding the lower limit, the power of the first and second lens groups are unavoidably intensified, resulting in a difficulty in correction of aberration, principally the coma aberration. Conversely, when exceeding the upper limit, a great positive distortion aberration occurs at the tele position, and a spherical aberration also lacks in correction.

The condition (2) is provided so that the partial system of the second and third lens systems may have a greate magnification-variation ratio, the lower limit being a limit required therefore. When exceeding the upper limit, the lens system becomes large, which is opposed to the object of compactness, and a great negative distortion aberration occurs at the wide position and a spherical aberration becomes corrected excessively.

The condition (3) is provided to restrain a coma aberration produced in the second lens group while maintaining the wide magnification-variation ratio. The upper limit is a limit which is provided so that the power of the second lens group need be intensified in order to make the system compact while maintaining the magnification variation ratio of the zoom lens system. When exceeding the lower limit, the negative power of the second lens group becomes excessively strong, and with this, the radius of curvature of each lens surface becomes small and a coma aberration materially occurs. The curve of the image plane also becomes over-corrected.

The condition (4) relates to the relative movement of the fourth lens group to the first lens group, and the exceeding of the lower limit means lesser movement of the fourth lens group, decreasing the contribution to the zoom ratio. Conversely, when exceeding the upper limit, the contribution to the zoom ratio increases but an air-space with respect to the second lens group is too wide, resulting in a short correction of spherical aberration.

On the other hand, the fourth lens group moves relatively to the third lens group, and can be contributed to the aberration correction in a sense similar to the floating mechanism normally used for wide angle lenses and microlenses. Especially, this relative movement exhibits effects with respect to the curve of the image plane which tends to be a short correction at both wide and tele positions and to be over-correction in the intermediary therebetween, but to achieve such effects, it is desirable that when zooming is carried out from the wide position to the tele position, the amount of relative movement is varied so as to be decreased at the intermediary and again increased.

The condition (9) is provided for the case where the relative movement of the third lens group and the fourth lens group is utilized for magnification-variation, and when exceeding the lower limit, the contribution of the fourth lens group to the magnification variation is excessively small whereas when exceeding the upper limit, the zoom lens system leads to a large scaled system.

In this case, the coefficient of movement $K_{3(f)}$ of the third lens group is in compliance with the following condition similar to $K_{4(f)}$.

$$0.3 < K_{3(f)} < 3 \tag{5}$$

This condition has the same meaning as that of $K_{4(f)}$.

In this zoom lens system, the distortion aberration at the tele position may be satisfactorily corrected by adding the fixed or slightly movable fifth lens group having a positive long focal distance $f_5$ to the image side of the fourth lens group. It is desirable that the fifth lens group is satisfied with the following conditions:

$$0.5 f_T < f_5 < 5.0 f_T \tag{6}$$

$$-0.5 f_T < X_{5(f)} < 0.5 f_T \tag{7}$$

When exceeding the upper limit of these conditions, the correction of the positive distortion aberration is insufficient and if exceeding the lower limit, the coma aberration occurs. When exceeding the lower limit of the condition (7), the effective diameter of the lens group becomes large.

Secondarily speaking, it is desirable that the zoom lens system of the present invention is satisfied with the following conditions:

$$-0.3 fw < X_{2(T)} < 0.3 fw \tag{8}$$

The condition (8) relates to the movement of the second lens group, and when exceeding the upper limit, the contribution to the zoom ratio increases and therefore, the amount of movement of the first lens group is unavoidably increased and a great positive distortion aberration occurs at the tele position. On the other hand, when exceeding the lower limit, $t_{1.2T}$ in the condition (1) becomes large, resulting in the aforementioned difficulty.

BRIEF DESCRIPTION OF THE DRAWINGS

FIG. 3 is an aberration view thereof;

FIG. 6 is an aberration view thereof;

DETAILED DESCRIPTION OF THE PREFERRED EMBODIMENTS

Figure 1:
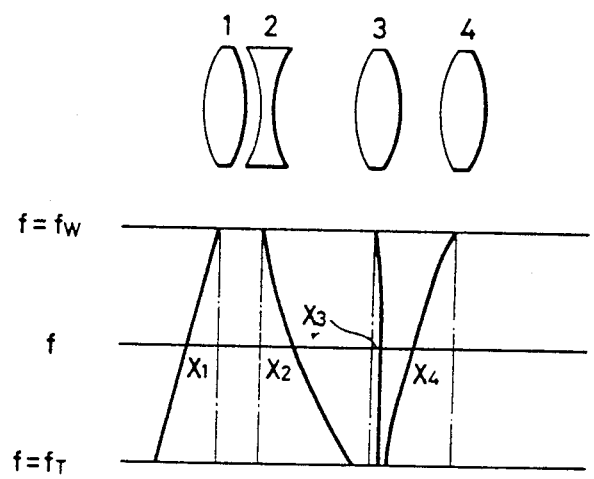
FIG. 1 is a structural view of a zoom lens system in accordance with the present invention and a view of moving locus of each lens group.
Figure 2:
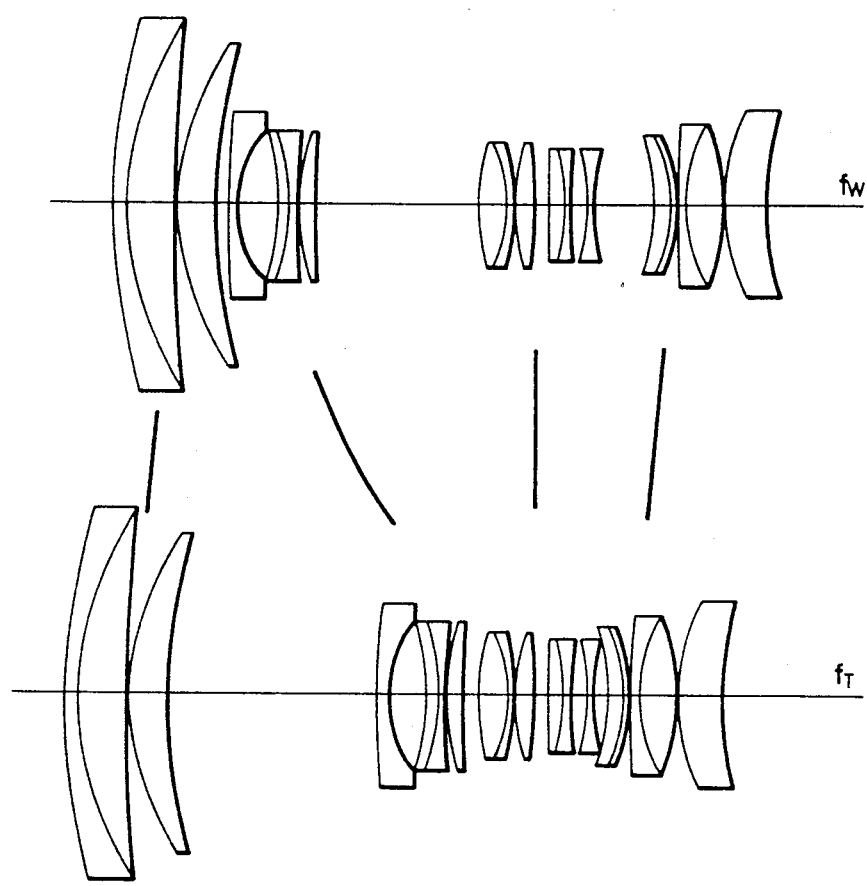
FIG. 2 is a sectional view of lens in Embodiment 1.
Figure 4:
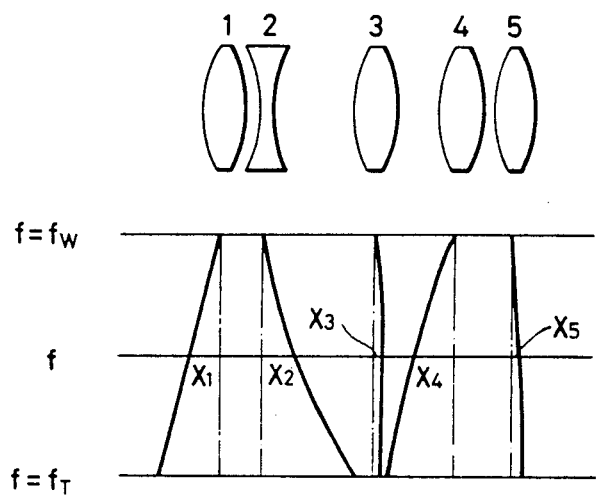
FIG. 4 is a structural view of a zoom lens in accordance with the present invention having a fifth lens group and a view of moving locus of each lens group.
Figure 7:
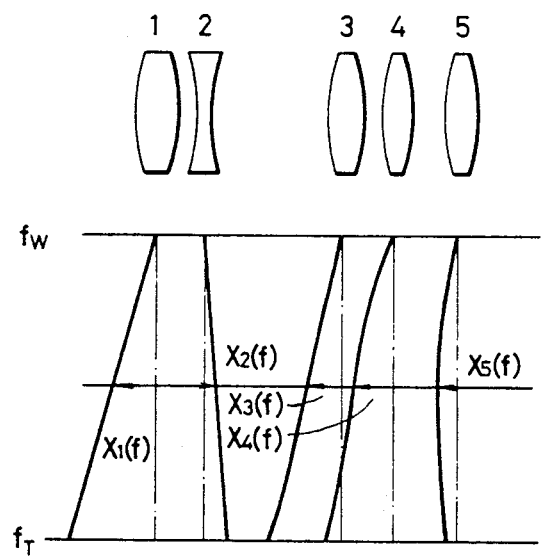
FIG. 7 is a structural view of a zoom lens in which relative movement of third and fourth lens groups is used for aberration correction and a view of moving focus of each lens group.
Figure 5:
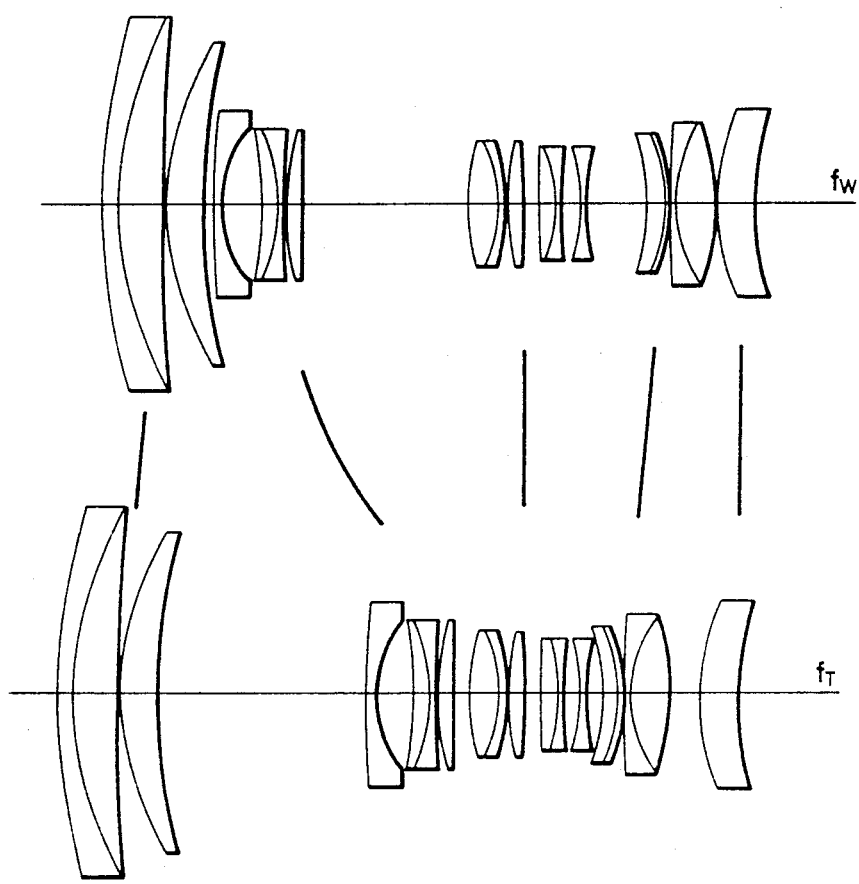
FIG. 5 is a sectional view of lens in Embodiment 2.
Figure 8:
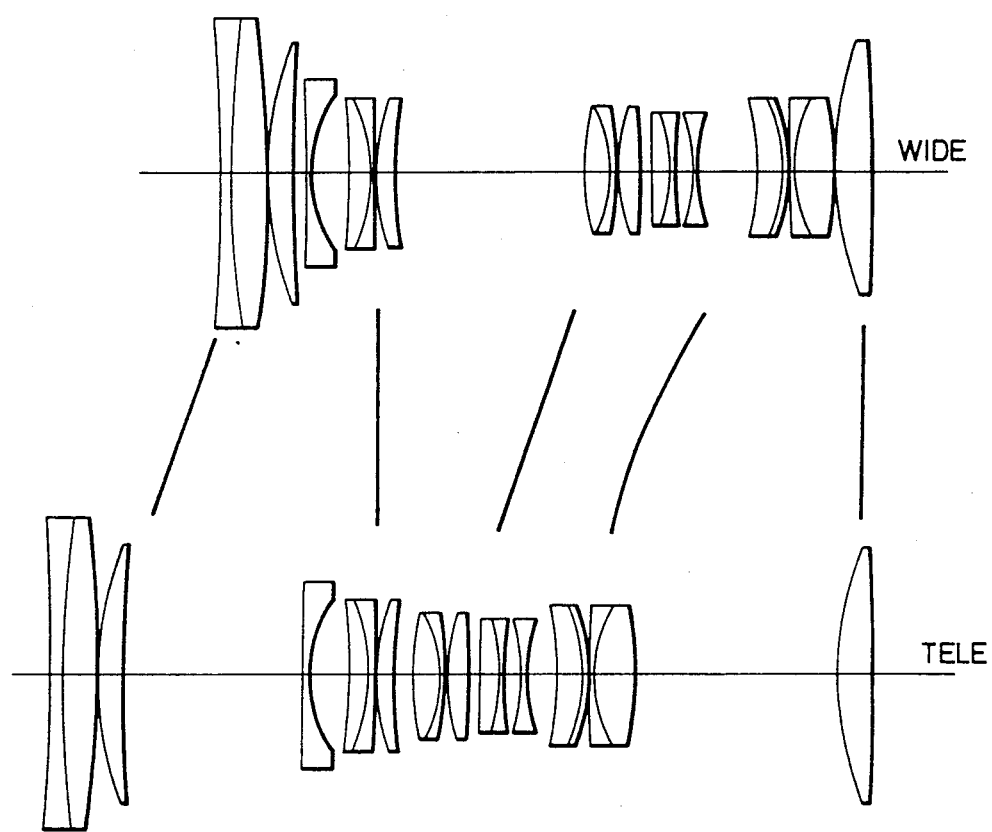
FIG. 8 is a sectional view of a lens in Embodiment 3.
Figure 9:
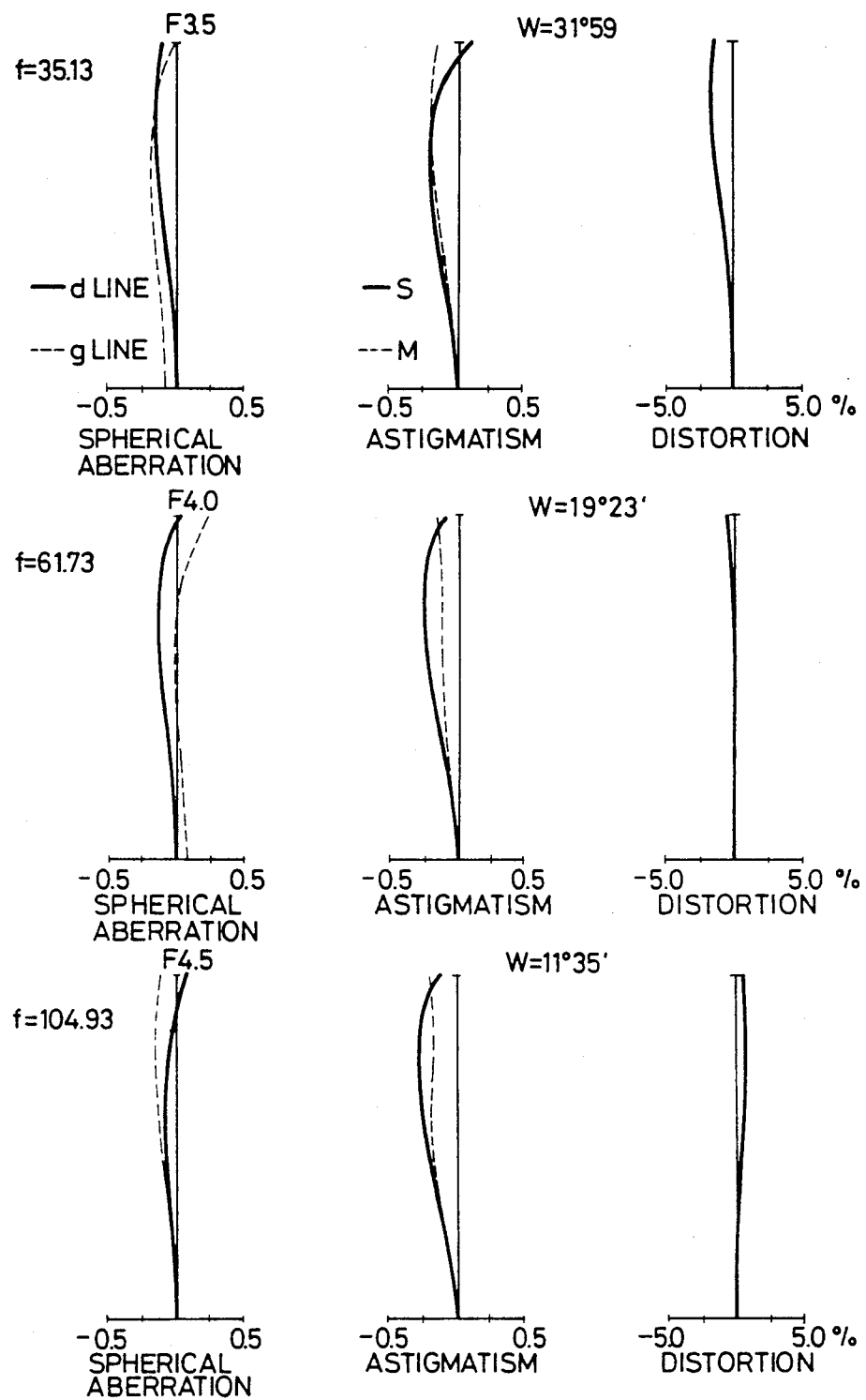
FIG. 9 is an aberration view thereof.
Figure 10:
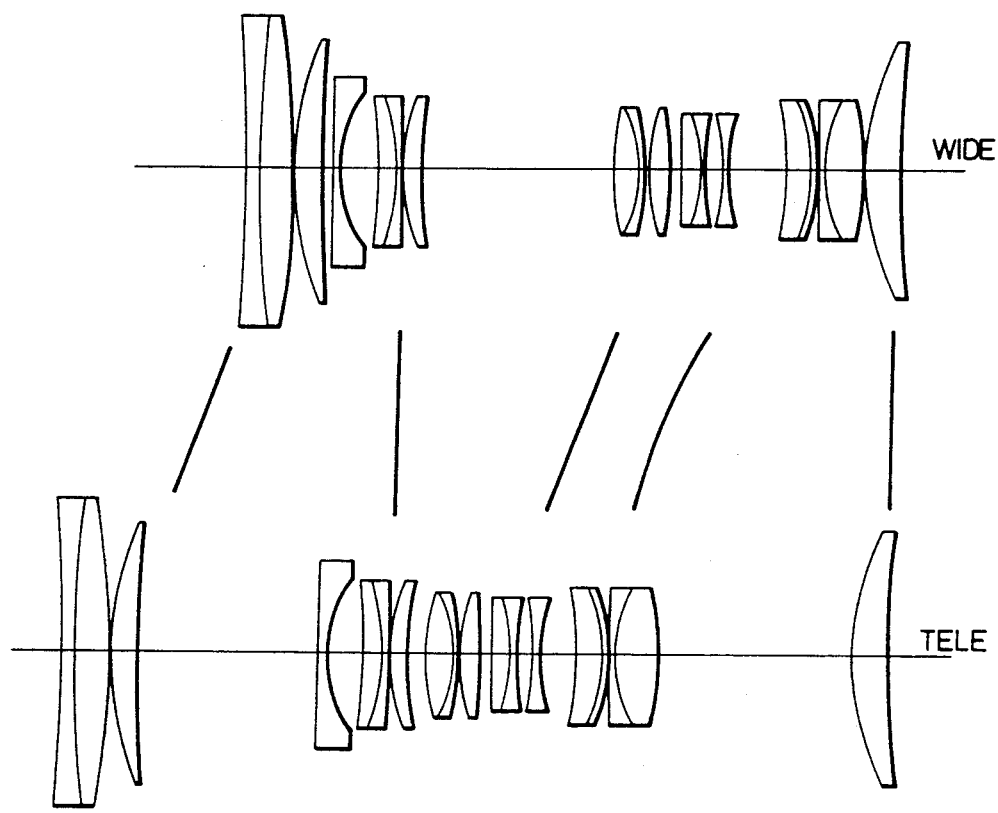
FIGS. 10, 12 and 14 are respectively sectional views of lenses in Embodiments 4, 5 and 6.
Figure 11:
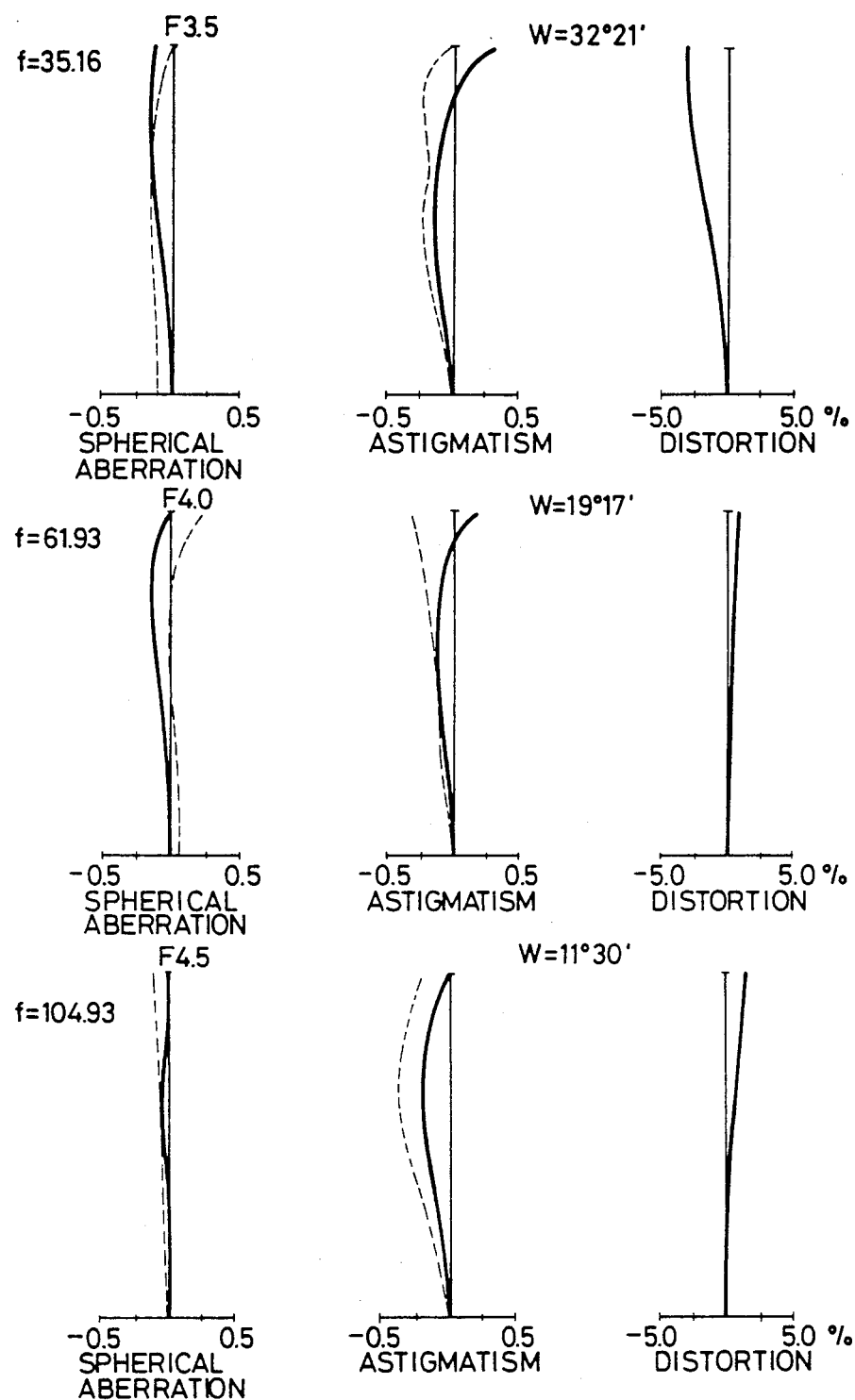
FIGS. 11, 13 and 15 are aberration views thereof.
Figure 12:
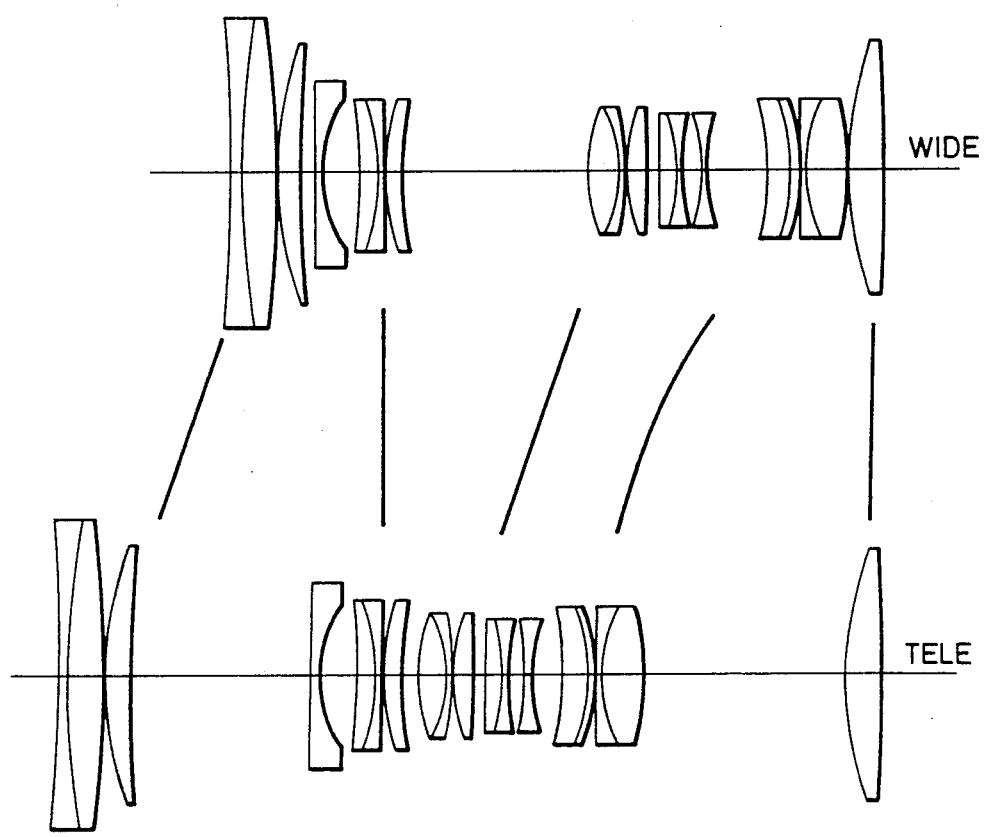
Figure 13:
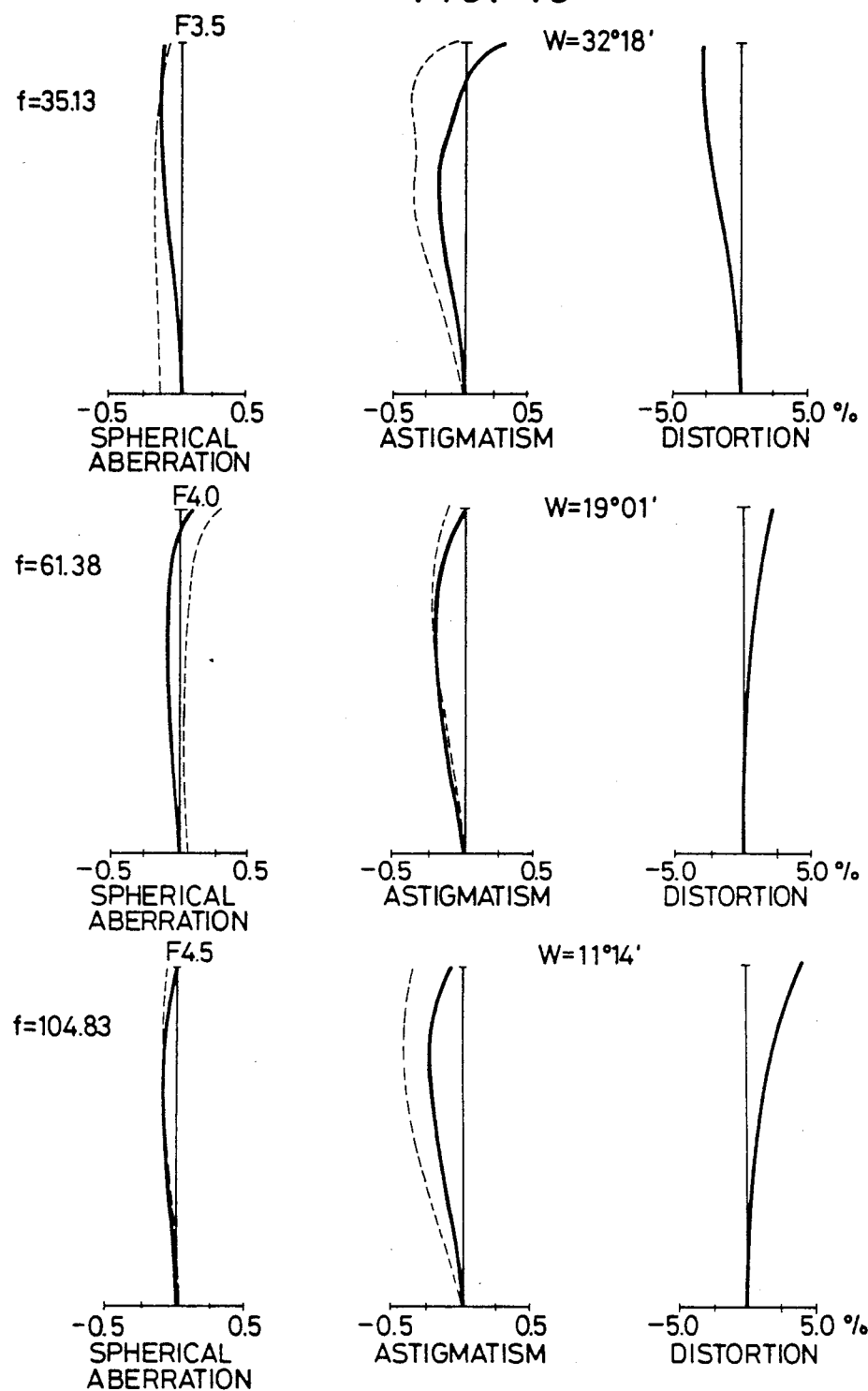
Figure 14:
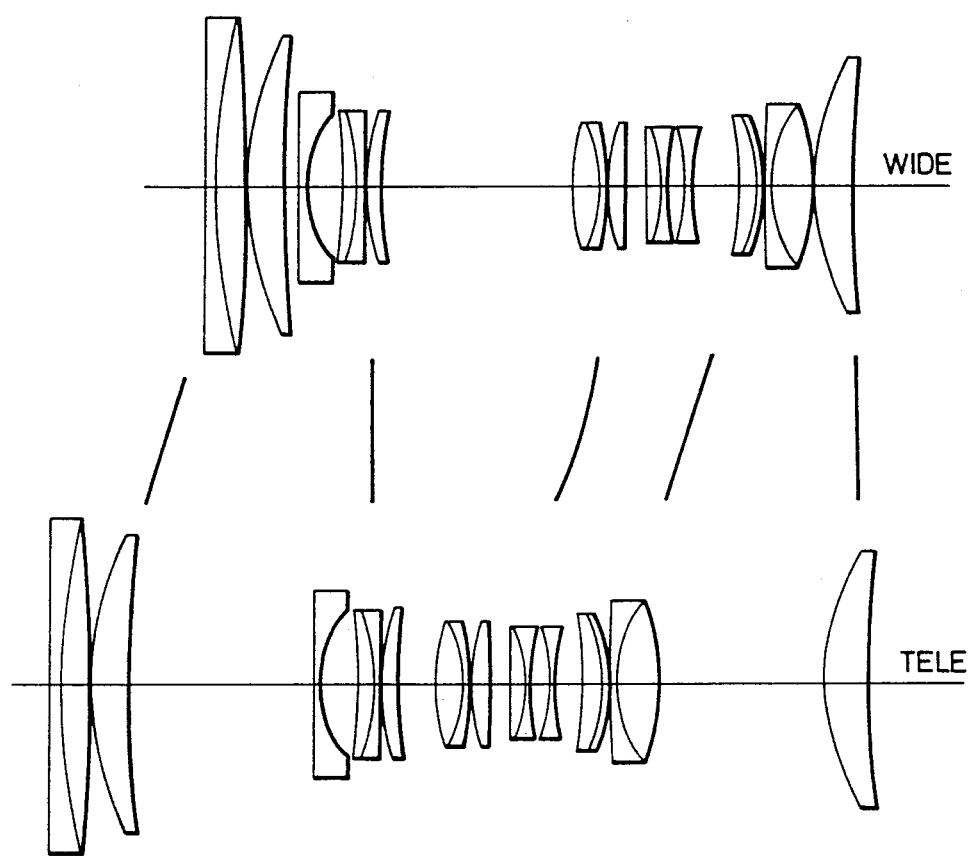
Figure 15:
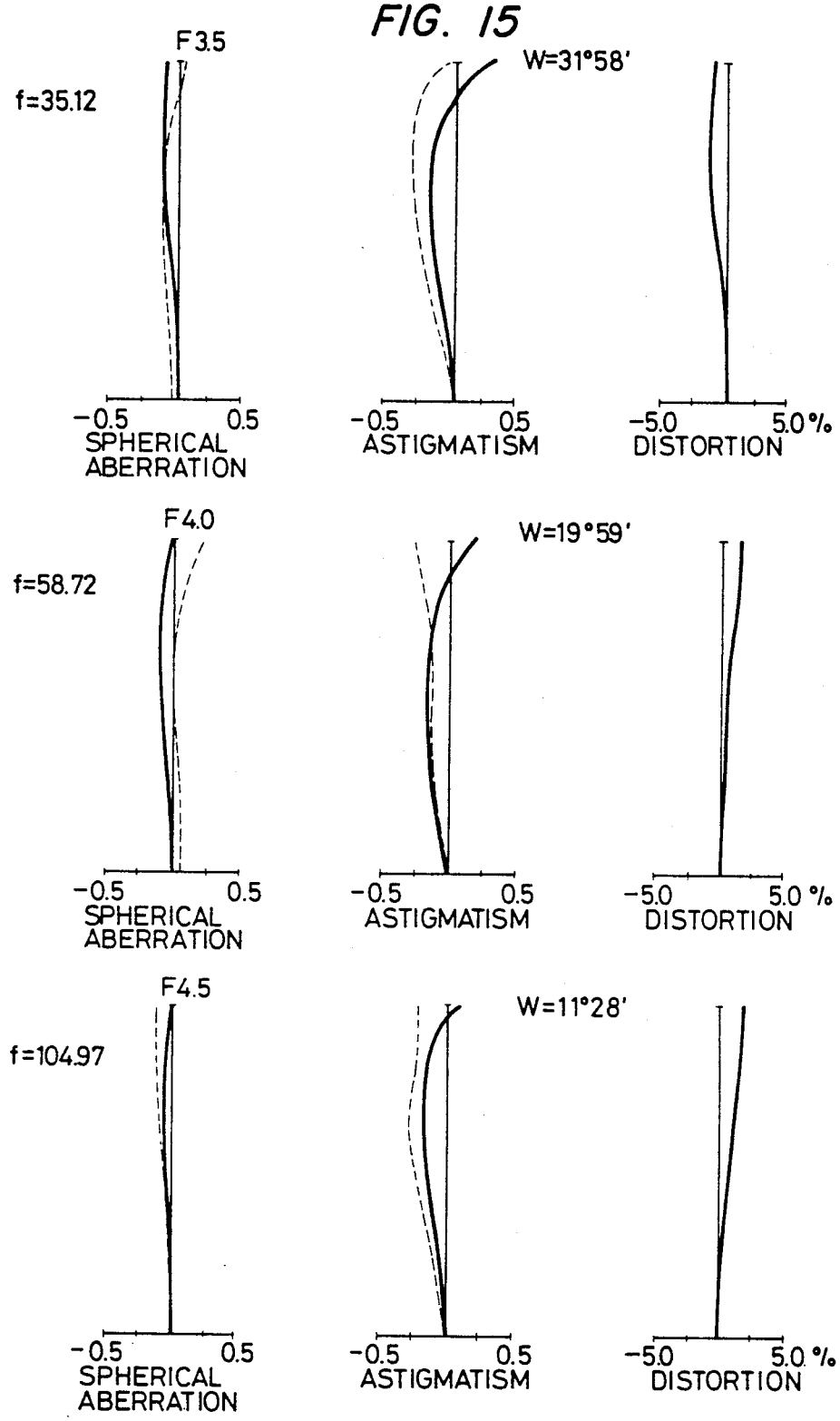

If the zoom lens system satisfying the above-described conditions is further specified, there is provided a zoom lens system which comprises a first lens group composed of a cemented lens consisting of positive and negative single lenses and a positive single lens, a second lens group composed of a group of two negative lenses and a group of positive lenses, a third lens group composed of at least a positive lens and at least a group of negative lenses, and a fourth lens group composed of at least two groups of positive lenses, which zoom lens system satisfies the following conditions:

$$0.5 f_T < f_1 < 1.5 f_T \tag{10}$$

$$1.7 < NN_2 \tag{11}$$

$$40 < \nu P_1 \tag{12}$$

$$40 < \nu N_2 \tag{13}$$

$$0.3 fw < \gamma_A < 0.9 fw \tag{14}$$

where
  $NN_i$: mean refractive index of the negative lens in the i lens group
  $\nu P_i$: mean Abbe's numbers of the positive lens in the i lens group
  $\gamma_A$: radius of curvature of the image side of the head negative lens on the object side in the second lens group $\nu$Ni: mean Abbe's numbers of the negative lens in the i lens group In the condition (10), if the focal length of the first lens group exceeds the lower limit, a short correction in spherical aberration results at the tele position and in addition, the positive distortion aberration at the tele position becomes large. Conversely, if the focal length exceeds the upper limit, the spherical aberration at the wide position becomes over-corrected and further the negative distortion aberration at the wide position becomes large.

The condition (11) is provided to maintain a proper Petzval's sum. If the refractive index exceeds the lower limit, the radius of curvature of the negative lens is unavoidably decreased, the Petzval's sum becomes excessively small, and the curve of the sagital image plane becomes large. In addition, occurrence of coma flare increases.

The conditions (12) and (13) relate to the correction of chromatic aberration. The condition (12) is provided to effect chromatic correction of the first lens group, which is the requisite for correcting chromatic aberration of the entire zoom lens system, in a satisfactory manner. The quality of the chromatic correction of the second lens group having the strongest refractive power among all lens groups greatly influences on the whole lens system, and the condition (13) is provided therefore.

The condition (11) is important in correction of the coma aberration, and if the $\gamma_A$ exceeds the lower limit, occurrence of the coma flare is noticeable, whereas if exceeding the upper limit, a short correction of the image plane curve at the wide position results.

In the following, embodiments of the zoom lens system according to the present invention will be illustrated.

Embodiment 1 has four groups, in which the third lens group is fixed, and the first and fourth lens groups are integrally moved. Embodiment 2 has five groups having the fifth lens group, in which the third and fifth lens groups are fixed, and the first and fourth lens groups are integrally moved.

In Embodiments 3 to 5, the second and fifth lens groups are fixed, and the first and third lens groups are integrally moved. In Embodiment 6, the second and fifth lens groups are fixed, and the first and fourth lens groups are integrally moved. Despite the employment of such a disadvantageous moving system for the correction of aberration as described above in order to simplify the construction of the barrel, sufficient aberration correction can be carried out as shown in the figures for aberration.

It is needless to say that in these embodiments, if the lens groups fixed or moved integral with other lens groups are moved independently from each other, the freedom of the system increases and the aberration correction may be further advantageously effected.

Embodiment 1

|   |   | R | d | n | $\nu$ |
|---|---|---|---|---|---|
| 1 |   | 117.842 | 2.00 | 1.80518 | 25.0 |
| 2 |   | 59.774 | 8.00 | 1.62299 | 58.2 |
| 3 | 1 | 519.689 | 0.20 |   |   |
| 4 |   | 46.841 | 6.00 | 1.69680 | 55.5 |
| 5 |   | 107.461 | dI |   |   |
| 6 |   | 190.981 | 1.20 | 1.81600 | 46.6 |
| 7 |   | 18.527 | 6.55 |   |   |
| 8 |   | −55.368 | 2.30 | 1.80518 | 25.4 |
| 9 | 2 | −33.225 | 1.20 | 1.81600 | 46.6 |
| 10 |   | 181.151 | 0.20 |   |   |
| 11 |   | 40.259 | 2.50 | 1.80518 | 25.4 |
| 12 |   | 300.512 | dII |   |   |
| 13 |   | 49.561 | 4.50 | 1.62299 | 58.2 |
| 14 |   | −21.215 | 1.00 | 1.80518 | 25.4 |
| 15 |   | −49.873 | 0.20 |   |   |
| 16 |   | 28.701 | 3.00 | 1.69680 | 55.5 |
| 17 | 3 | −99.568 | 2.66 |   |   |
| 18 |   | −906.891 | 2.50 | 1.80518 | 25.4 |
| 19 |   | −30.319 | 1.20 | 1.81600 | 46.6 |
| 20 |   | 130.557 | 2.60 |   |   |
| 21 |   | −35.388 | 1.00 | 1.78590 | 44.2 |
| 22 |   | 37.388 | dIII |   |   |
| 23 |   | −49.083 | 3.00 | 1.71300 | 53.8 |
| 24 |   | −25.651 | 1.00 | 1.80518 | 25.4 |
| 25 |   | −28.457 | 0.20 |   |   |
| 26 | 4 | 353.178 | 1.00 | 1.83400 | 37.2 |
| 27 |   | 23.128 | 6.50 | 1.51633 | 64.1 |
| 28 |   | −40.087 | 0.20 |   |   |
| 29 |   | 32.778 | 7.00 | 1.51633 | 64.1 |
| 30 |   | 57.268 |   |   |   |

|   | f | dI | dII | dIII | FNo. |
|---|---|---|---|---|---|
| T | 104.999 | 34.090 | 3.000 | 2.000 | 4.5 |
| M | 59.656 | 19.266 | 15.666 | 4.158 | 4.0 |
| W | 35.105 | 2.000 | 27.224 | 9.866 | 3.5 | fI = 89.291
fII = −24.556
fIII = 46.606
fIV = 48.092

Embodiment 2

|   |   | R | d | n | $\nu$ |
|---|---|---|---|---|---|
| 1 |   | 132.460 | 2.00 | 1.80518 | 25.0 |
| 2 |   | 62.879 | 8.00 | 1.62299 | 58.2 |
| 3 | 1 | 1225.753 | 0.20 |   |   |
| 4 |   | 47.762 | 6.50 | 1.69680 | 55.5 |
| 5 |   | 125.777 | dI |   |   |
| 6 |   | 244.168 | 1.20 | 1.81600 | 46.6 |
| 7 |   | 18.416 | 6.55 |   |   |
| 8 |   | −44.997 | 2.30 | 1.80518 | 25.4 |
| 9 | 2 | −30.179 | 1.20 | 1.81600 | 46.6 |
| 10 |   | 257.320 | 0.20 |   |   |
| 11 |   | 44.107 | 2.50 | 1.80518 | 25.4 |
| 12 |   | −10693.06 | dII |   |   |
| 13 |   | 54.186 | 4.50 | 1.62299 | 58.2 |
| 14 |   | −21.736 | 1.00 | 1.80518 | 25.4 |
| 15 |   | −49.065 | 0.20 |   |   |
| 16 |   | 30.704 | 3.00 | 1.69680 | 55.5 |
| 17 |   | −119.983 | 3.13 |   |   |
| 18 | 3 | −408.511 | 2.50 | 1.80518 | 25.4 |
| 19 |   | −30.544 | 1.20 | 1.81600 | 46.6 |
| 20 |   | 352.213 | 2.60 |   |   |
| 21 |   | −38.525 | 1.00 | 1.78590 | 44.2 |
| 22 |   | 36.959 | dIII |   |   |
| 23 |   | −63.042 | 3.00 | 1.71300 | 53.8 |
| 24 |   | −24.461 | 1.00 | 1.80518 | 25.4 |
| 25 |   | −30.822 | 0.20 |   |   |
| 26 | 4 | 155.475 | 1.00 | 1.83400 | 37.2 |
| 27 |   | 25.073 | 6.50 | 1.51633 | 64.1 |
| 28 |   | −42.383 | dIV |   |   |
| 29 | 5 | 34.121 | 7.00 | 1.51633 | 64.1 |
| 30 |   | 45.516 |   |   |   |

|   | f | dI | dII | dIII | dIV | FNo. |
|---|---|---|---|---|---|---|
| T | 104.993 | 32.617 | 3.000 | 2.000 | 9.168 | 4.5 |
| M | 59.663 | 18.590 | 15.094 | 3.034 | 7.233 | 4.0 |
| W | 35.093 | 2.000 | 24.651 | 10.967 | 0.200 | 3.5 | fI = 84.00
fII = −23.43
fIII = 47.99
fIV = 60.65

-continued

Embodiment 2 fV = 218.29

Embodiment 3

|   |   | R | d | n | ν |
|---|---|---|---|---|---|
| 1 |   | 1685.046 | 2.00 | 1.80518 | 25.0 |
| 2 | 1 | 137.358 | 5.00 | 1.62230 | 53.2 |
| 3 |   | −546.643 | 0.20 |   |   |
| 4 |   | 56.914 | 5.00 | 1.69680 | 55.5 |
| 5 |   | 391.533 | dI |   |   |
| 6 |   | 335.982 | 1.20 | 1.81600 | 46.6 |
| 7 |   | 19.658 | 6.55 |   |   |
| 8 |   | −65.425 | 2.30 | 1.80518 | 25.4 |
| 9 | 2 | −42.732 | 1.20 | 1.81600 | 46.6 |
| 10 |   | −355.394 | 0.20 |   |   |
| 11 |   | 35.932 | 2.50 | 1.80518 | 25.4 |
| 12 |   | 91.601 | dII |   |   |
| 13 |   | 41.828 | 4.50 | 1.62299 | 58.2 |
| 14 |   | −21.388 | 1.00 | 1.80518 | 25.4 |
| 15 |   | −48.271 | 0.20 |   |   |
| 16 |   | 29.922 | 3.00 | 1.69680 | 55.5 |
| 17 | 3 | −109.384 | 2.43 |   |   |
| 18 |   | 1809.543 | 2.50 | 1.80518 | 25.4 |
| 19 |   | −29.369 | 1.20 | 1.81600 | 46.6 |
| 20 |   | 66.894 | 2.60 |   |   |
| 21 |   | −32.694 | 1.00 | 1.78590 | 44.2 |
| 22 |   | 39.471 | dIII |   |   |
| 23 |   | −60.366 | 3.00 | 1.71300 | 53.8 |
| 24 |   | −25.579 | 1.00 | 1.80518 | 25.4 |
| 25 | 4 | −28.919 | 0.20 |   |   |
| 26 |   | 754.056 | 1.00 | 1.83400 | 37.2 |
| 27 |   | 23.608 | 6.50 | 1.51633 | 64.1 |
| 28 |   | −53.665 | dIV |   |   |
| 29 | 5 | 41.426 | 7.00 | 1.51633 | 64.1 |
| 30 |   | 221.545 |   |   |   |

|   | f | dI | dII | dIII | dIV | FNo. |
|---|---|----|-----|------|-----|------|
| T | 104.93 | 30.00 | 3.00 | 5.86 | 32.06 | 4.5 |
| M | 61.73 | 16.50 | 150 | 5.00 | 19.42 | 4.0 |
| W | 35.13 | 2.00 | 31.00 | 9.72 | 0.20 | 3.5 | fI = 92.26
fII = −30.07
fIII = 51.62
fIV = 96.41
fV = 97.40

Embodiment 4

|   |   | R | d | n | ν |
|---|---|---|---|---|---|
| 1 |   | −364.082 | 2.00 | 1.80518 | 25.0 |
| 2 |   | 204.616 | 6.00 | 1.62230 | 53.2 |
| 3 | I | −139.245 | 0.20 |   |   |
| 4 |   | 55.304 | 4.00 | 1.69680 | 55.5 |
| 5 |   | 211.080 | dI |   |   |
| 6 |   | 866.035 | 1.20 | 1.81600 | 46.6 |
| 7 |   | 20.213 | 6.55 |   |   |
| 8 |   | −80.752 | 2.80 | 1.80518 | 25.4 |
| 9 | II | −41.601 | 1.20 | 1.81600 | 46.6 |
| 10 |   | −631.263 | 0.20 |   |   |
| 11 |   | 34.746 | 3.00 | 1.80518 | 25.4 |
| 12 |   | 76.396 | dII |   |   |
| 13 |   | 39.771 | 4.50 | 1.62299 | 58.2 |
| 14 |   | −21.599 | 1.00 | 1.80518 | 25.4 |
| 15 |   | −49.836 | 0.20 |   |   |
| 16 |   | 29.467 | 3.50 | 1.69680 | 55.5 |
| 17 | III | −98.677 | 1.79 |   |   |
| 18 |   | 3426.221 | 3.00 | 1.80518 | 25.4 |
| 19 |   | −29.843 | 1.20 | 1.81600 | 46.6 |
| 20 |   | 71.973 | 2.60 |   |   |
| 21 |   | −33.904 | 1.00 | 1.78590 | 44.2 |

-continued

Embodiment 4

|   |   | R | d | n | ν |
|---|---|---|---|---|---|
| 22 |   | 33.574 | dIII |   |   |
| 23 |   | −61.746 | 4.00 | 1.71300 | 53.8 |
| 24 |   | −28.572 | 1.00 | 1.80518 | 25.4 |
| 25 | IV | −32.942 | 0.20 |   |   |
| 26 |   | 2488.937 | 1.00 | 1.83400 | 37.2 |
| 27 |   | 23.668 | 6.80 | 1.58913 | 61.0 |
| 28 |   | −59.078 | dIV |   |   |
| 29 | V | 43.954 | 5.80 | 1.56873 | 63.1 |
| 30 |   | 160.040 |   |   |   |

|   | f | dI | dII | dIII | dIV | FNo. |
|---|---|----|-----|------|-----|------|
| T | 104.93 | 30.0 | 3.00 | 5.90 | 32.06 | 4.5 |
| M | 61.48 | 16.5 | 16.5 | 5.50 | 18.96 | 4.0 |
| W | 35.16 | 2.0 | 31.00 | 9.76 | 0.20 | 3.5 | fI = 91.24
fII = −29.97
FIII = 50.24
fIV = 96.18
fV = 104.65

Embodiment 5

|   |   | R | d | n | ν |
|---|---|---|---|---|---|
| 1 |   | −519.654 | 2.00 | 1.80518 | 25.0 |
| 2 |   | 179.756 | 6.00 | 1.62230 | 53.2 |
| 3 | I | −184.513 | 0.20 |   |   |
| 4 |   | 57.973 | 4.00 | 1.69680 | 55.5 |
| 5 |   | 322.429 | dI |   |   |
| 6 |   | −2191.042 | 1.20 | 1.81600 | 46.6 |
| 7 |   | 22.133 | 6.55 |   |   |
| 8 |   | −87.250 | 2.80 | 1.80518 | 25.4 |
| 9 | II | −41.868 | 1.20 | 1.81600 | 46.6 |
| 10 |   | 1326.117 | 0.20 |   |   |
| 11 |   | 38.360 | 3.00 | 1.80518 | 25.4 |
| 12 |   | 94.963 | dII |   |   |
| 13 |   | 42.106 | 4.50 | 1.62299 | 58.2 |
| 14 |   | −22.222 | 1.00 | 1.80518 | 25.4 |
| 15 |   | −50.884 | 0.20 |   |   |
| 16 |   | 27.161 | 3.50 | 1.69680 | 55.5 |
| 17 | III | −107.726 | 1.75 |   |   |
| 18 |   | 515.712 | 3.00 | 1.80518 | 25.4 |
| 19 |   | −31.917 | 1.20 | 1.81600 | 46.6 |
| 20 |   | 65.113 | 2.60 |   |   |
| 21 |   | −34.928 | 1.00 | 1.78590 | 44.2 |
| 22 |   | 31.051 | dIII |   |   |
| 23 |   | −51.728 | 4.00 | 1.71300 | 53.8 |
| 24 |   | −26.680 | 1.00 | 1.80518 | 25.4 |
| 25 | IV | −34.046 | 0.20 |   |   |
| 26 |   | 480.267 | 1.00 | 1.83400 | 37.2 |
| 27 |   | 24.973 | 6.80 | 1.58913 | 61.0 |
| 28 |   | −55.606 | dIV |   |   |
| 29 | V | 64.267 | 5.80 | 1.56873 | 63.1 |
| 30 |   | −367.464 |   |   |   |

|   | f | dI | dII | dIII | dIV | FNo. |
|---|---|----|-----|------|-----|------|
| T | 104.83 | 30.00 | 3.00 | 5.02 | 32.98 | 4.5 |
| M | 61.38 | 16.50 | 16.50 | 5.00 | 19.50 | 4.0 |
| W | 35.13 | 2.0 | 31.00 | 9.80 | 0.20 | 3.5 | fI = 91.59
fII = −30.15
fIII = 49.21
fIV = 100.40
fV = 96.65

Embodiment 6

|   | R | d | n | ν |
|---|---|---|---|---|
| 1 | 1546.649 | 2.00 | 1.80518 | 25.0 |
| 2 | 115.765 | 5.00 | 1.62230 | 53.2 |

-continued

| | | Embodiment 6 | | | |
|---|---|---|---|---|---|
| 3 | 1 | −293.700 | 0.20 | | |
| 4 | | 53.459 | 6.00 | 1.69680 | 55.5 |
| 5 | | 241.557 | dI | | |
| 6 | | 384.404 | 1.20 | 1.81600 | 46.6 |
| 7 | | 18.799 | 6.55 | | |
| 8 | | −71.048 | 2.30 | 1.80518 | 25.4 |
| 9 | 2 | −38.523 | 1.20 | 1.81600 | 46.6 |
| 10 | | 24025.370 | 0.20 | | |
| 11 | | 34.507 | 2.50 | 1.80518 | 25.4 |
| 12 | | 90.541 | dII | | |
| 13 | | 42.406 | 4.50 | 1.62299 | 58.2 |
| 14 | | −21.548 | 1.00 | 1.80518 | 25.4 |
| 15 | | −58.909 | 0.20 | | |
| 16 | | 29.656 | 3.00 | 1.69680 | 55.5 |
| 17 | 3 | −112.680 | 3.32 | | |
| 18 | | 5325.193 | 2.50 | 1.80518 | 25.4 |
| 19 | | −29.859 | 1.20 | 1.81600 | 46.6 |
| 20 | | 68.876 | 2.60 | | |
| 21 | | −31.877 | 1.00 | 1.78590 | 44.2 |
| 22 | | 41.754 | dIII | | |
| 23 | | −57.355 | 3.00 | 1.71300 | 53.8 |
| 24 | | −26.480 | 1.00 | 1.80518 | 25.4 |
| 25 | 4 | −29.914 | 0.20 | | |
| 26 | | 268.952 | 1.00 | 1.83400 | 37.2 |
| 27 | | 22.095 | 6.50 | 1.51633 | 64.1 |
| 28 | | −54.400 | dIV | | |
| 29 | 5 | 41.811 | 7.00 | 1.51633 | 64.1 |
| 30 | | 228.144 | | | |

| | f | dI | dII | dIII | dIV | FNo. |
|---|---|---|---|---|---|---|
| T | 104.97 | 30.00 | 6.50 | 5.02 | 28.20 | 4.5 |
| M | 58.72 | 16.50 | 20.29 | 4.74 | 14.70 | 4.0 |
| W | 35.12 | 2.0 | 31.67 | 7.86 | 0.20 | 3.5 | fI = 87.83
fII = −27.57
fIII = 48.15
fIV = 100.54
fV = 97.90

What is claimed is:

1. A compact zoom lens system comprising a first lens group having a positive focal length, a second lens group having a negative focal length, a third lens group having a positive focal length and a fourth lens group similarly having a positive focal length in the order from the object side, wherein a partial system consisting of the first lens group and the second lens group has a negative resultant focal length over the entire range of zooming, and when zooming is carried out from the wide position to the tele position, the first lens group and the fourth lens group are moved towards the object, the second lens group is moved towards the image, and the third lens group is arranged so that an airspace formed between the third lens group and the second lens group is decreased and an airspace formed between the third lens group and the fourth lens group is also decreased, and further wherein a fifth positive lens group is arranged on the image side of the fourth lens group, said lens system satisfying the following conditions:

$$0.4fw < t_{1.2T} < 1.5fw$$

$$0.4fw < t_{2.3w} < 1.5fw$$

$$0.4fw < |f_2| < 1.5fw, \ f_2 < 0$$

$$0.3 < K_{4(f)} < 3$$

$$0.5f_T < f_5 < 5.0f_T$$

$$-0.5f_T < X_{5(f)} < 0.5f_T$$

where:
f: focal length as a whole at a suitable zooming position.
fw: f at the wide position
fT: f at the tele position
fi: focal length of the i lens group
Xi(f): amount of movement of the i lens group where focal length is f with the wide position as a reference; movement towards the object being positive, movement towards the image being negative
Ki(f): coefficient indicative of the ratio of amount of movement of the i lens group at the focal length f to the amount of movement Xl(f) of the first lens group, $Ki(f) = Xi(f)/Xl(f)$
$t_{1.2T}$: Airspace between the first and second lens groups at the tele position
$t_{2.3w}$: Air space between the second and third lens groups at the wide position, and
$t_{3.4w}$: Airspace between the third and fourth lens groups at the wide position.

2. The zoom lens system according to claim 1, which satisfies the following condition:

$$-0.3fw < X_{2(T)} < 0.3fw.$$

3. The zoom lens system according to claim 1, which satisfies the following conditions:

$$0.5f_T < f_1 < 1.5f_T$$

$$1.7 < NN_2$$

$$40 < \nu_{pI}$$

$$40 < \nu_{N2}$$

$$0.3fw < \gamma_A < 0.9fw$$

where
NN2: average value of refractive index of the negative lens of the second lens group.
$\nu_{pI}$: average value of Abbe number of the positive lens of the second lens group.
$\nu N_2$: average value of Abbe number of the negative lens of the second lens group.
$\gamma_A$: radius of curvature on the image side of the head negative lens on the object side of the second lens group.

4. The zoom lens system according to claim 3, which is illustrated by data as follows:

| | | R | d | n | ν |
|---|---|---|---|---|---|
| 1 | | 117.842 | 2.00 | 1.80518 | 25.0 |
| 2 | | 59.774 | 8.00 | 1.62299 | 58.2 |
| 3 | 1 | 519.689 | 0.20 | | |
| 4 | | 46.841 | 6.00 | 1.69680 | 55.5 |
| 5 | | 107.461 | dI | | |
| 6 | | 190.981 | 1.20 | 1.81600 | 46.6 |
| 7 | | 18.527 | 6.55 | | |
| 8 | | −55.368 | 2.30 | 1.80518 | 25.4 |
| 9 | 2 | −33.225 | 1.20 | 1.81600 | 46.6 |
| 10 | | 181.151 | 0.20 | | |
| 11 | | 40.259 | 2.50 | 1.80518 | 25.4 |
| 12 | | 300.512 | dII | | |
| 13 | | 49.561 | 4.50 | 1.62299 | 58.2 |
| 14 | | −21.215 | 1.00 | 1.80518 | 25.4 |
| 15 | | −49.873 | 0.20 | | |
| 16 | | 28.701 | 3.00 | 1.69680 | 55.5 |
| 17 | | −99.568 | 2.66 | | |

-continued

|   | | R | d | n | ν |
|---|---|---|---|---|---|
| 18 | 3 | −906.891 | 2.50 | 1.80518 | 25.4 |
| 19 | | −30.319 | 1.20 | 1.81600 | 46.6 |
| 20 | | 130.557 | 2.60 | | |
| 21 | | −35.388 | 1.00 | 1.78590 | 44.2 |
| 22 | | 37.388 | dIII | | |
| 23 | | −49.083 | 3.00 | 1.71300 | 53.8 |
| 24 | | −25.651 | 1.00 | 1.80518 | 25.4 |
| 25 | | −28.457 | 0.20 | | |
| 26 | | 353.178 | 1.00 | 1.83400 | 37.2 |
| | 4 | | | | |
| 27 | | 23.128 | 6.50 | 1.51633 | 64.1 |
| 28 | | −40.087 | 0.20 | | |
| 29 | | 32.778 | 7.00 | 1.51633 | 64.1 |
| 30 | | 57.268 | | | |

|   | f | dI | dII | dIII | FNo. |
|---|---|---|---|---|---|
| T | 104.999 | 34.090 | 3.000 | 2.000 | 4.5 |
| M | 59.656 | 19.266 | 15.666 | 4.158 | 4.0 |
| W | 35.105 | 2.000 | 27.224 | 9.866 | 3.5 |

5. The zoom lens system according to claim 3, which is illustrated by data as follows:

|   | | R | d | n | ν |
|---|---|---|---|---|---|
| 1 | | 132.460 | 2.00 | 1.80518 | 25.0 |
| 2 | | 62.879 | 8.00 | 1.62299 | 58.2 |
| 3 | 1 | 1225.753 | 0.20 | | |
| 4 | | 47.762 | 6.50 | 1.69680 | 55.5 |
| 5 | | 125.777 | dI | | |
| 6 | | 244.168 | 1.20 | 1.81600 | 46.6 |
| 7 | | 18.416 | 6.55 | | |
| 8 | | −44.997 | 2.30 | 1.80518 | 25.4 |
| 9 | 2 | −30.179 | 1.20 | 1.81600 | 46.6 |
| 10 | | 257.320 | 0.20 | | |
| 11 | | 44.107 | 2.50 | 1.80518 | 25.4 |
| 12 | | −10693.06 | dII | | |
| 13 | | 54.186 | 4.50 | 1.62299 | 58.2 |
| 14 | | −21.736 | 1.00 | 1.80518 | 25.4 |
| 15 | | −49.065 | 0.20 | | |
| 16 | | 30.704 | 3.00 | 1.69680 | 55.5 |
| 17 | | −119.983 | 3.13 | | |
| | 3 | | | | |
| 18 | | −408.511 | 2.50 | 1.80518 | 25.4 |
| 19 | | −30.544 | 1.20 | 1.81600 | 46.6 |
| 20 | | 352.213 | 2.60 | | |
| 21 | | −38.525 | 1.00 | 1.78590 | 44.2 |
| 22 | | 36.959 | dIII | | |
| 23 | | −63.042 | 3.00 | 1.71300 | 53.8 |
| 24 | | −24.461 | 1.00 | 1.80518 | 25.4 |
| 25 | | −30.822 | 0.20 | | |
| | 4 | | | | |
| 26 | | 155.475 | 1.00 | 1.83400 | 37.2 |
| 27 | | 25.073 | 6.50 | 1.51633 | 64.1 |
| 28 | | −42.383 | dIV | | |
| 29 | | 34.121 | 7.00 | 1.51633 | 64.1 |
| | 5 | | | | |
| 30 | | 45.516 | | | |

|   | f | dI | dII | dIII | dIV | FNo. |
|---|---|---|---|---|---|---|
| T | 104.993 | 32.617 | 3.000 | 2.000 | 9.168 | 4.5 |
| M | 59.663 | 18.590 | 15.094 | 3.034 | 7.233 | 4.0 |
| W | 35.098 | 2.000 | 24.651 | 10.967 | 0.200 | 3.5 |

6. The zoom lens system according to claim 3, which is illustrated by data as follows:

|   | R | d | n | ν |
|---|---|---|---|---|
| 1 | 1685.046 | 2.00 | 1.80518 | 25.0 |
| 2 | 137.358 | 5.00 | 1.62230 | 53.2 |
| 3 | −546.643 | 0.20 | | |
| 4 | 56.914 | 5.00 | 1.69680 | 55.5 |
| 5 | 391.533 | dI | | |
| 6 | 335.982 | 1.20 | 1.81600 | 46.6 |
| 7 | 19.658 | 6.55 | | |
| 8 | −65.425 | 2.30 | 1.80518 | 25.4 |
| 9 | −42.732 | 1.20 | 1.81600 | 46.6 |
| 10 | −355.394 | 0.20 | | |
| 11 | 35.932 | 2.50 | 1.80518 | 25.4 |
| 12 | 91.601 | dII | | |
| 13 | 41.828 | 4.50 | 1.62299 | 58.2 |
| 14 | −21.388 | 1.00 | 1.80518 | 25.4 |
| 15 | −48.271 | 0.20 | | |
| 16 | 29.922 | 3.00 | 1.69680 | 55.5 |
| 17 | −109.384 | 2.43 | | |
| 18 | 1809.543 | 2.50 | 1.80518 | 25.4 |
| 19 | −29.369 | 1.20 | 1.81600 | 46.6 |
| 20 | 66.894 | 2.60 | | |
| 21 | −32.694 | 1.00 | 1.78590 | 44.2 |
| 22 | 39.471 | dIII | | |
| 23 | −60.366 | 3.00 | 1.71300 | 53.8 |
| 24 | −25.579 | 1.00 | 1.80518 | 25.4 |
| 25 | −28.919 | 0.20 | | |
| 26 | 754.056 | 1.00 | 1.83400 | 37.2 |
| 27 | 23.608 | 6.50 | 1.51633 | 64.1 |
| 28 | −53.665 | dIV | | |
| 29 | 41.426 | 7.00 | 1.51633 | 64.1 |
| 30 | 221.545 | | | |

|   | d | dI | dII | dIII | dIV | FNo. |
|---|---|---|---|---|---|---|
| T | 104.93 | 30.00 | 3.00 | 5.86 | 32.06 | 4.5 |
| M | 61.73 | 16.50 | 16.50 | 5.00 | 19.42 | 4.0 |
| W | 35.13 | 2.00 | 31.00 | 9.72 | 0.20 | 3.5 |

7. The zoom lens system according to claim 3, which is illustrated by data as follows:

|   | | R | d | n | ν |
|---|---|---|---|---|---|
| 1 | | −364.082 | 2.00 | 1.80518 | 25.0 |
| 2 | | 204.616 | 6.00 | 1.62230 | 53.2 |
| 3 | I | −139.245 | 0.20 | | |
| 4 | | 55.304 | 4.00 | 1.69680 | 55.5 |
| 5 | | 211.080 | dI | | |
| 6 | | 866.035 | 1.20 | 1.81600 | 46.6 |
| 7 | | 20.213 | 6.55 | | |
| 8 | | −80.752 | 2.80 | 1.80518 | 25.4 |
| 9 | II | −41.601 | 1.20 | 1.81600 | 46.6 |
| 10 | | −631.263 | 0.20 | | |
| 11 | | 34.746 | 3.00 | 1.80518 | 25.4 |
| 12 | | 76.396 | dII | | |
| 13 | | 39.771 | 4.50 | 1.62299 | 58.2 |
| 14 | | −21.599 | 1.00 | 1.80518 | 25.4 |
| 15 | | −49.836 | 0.20 | | |
| 16 | | 29.467 | 3.50 | 1.69680 | 55.5 |
| 17 | | −98.677 | 1.79 | | |
| | III | | | | |
| 18 | | 3426.221 | 3.00 | 1.80518 | 25.4 |
| 19 | | −29.843 | 1.20 | 1.81600 | 46.6 |
| 20 | | 71.973 | 2.60 | | |
| 21 | | −33.904 | 1.00 | 1.78590 | 44.2 |
| 22 | | 33.574 | dIII | | |
| 23 | | −61.746 | 4.00 | 1.71300 | 53.8 |
| 24 | | −28.572 | 1.00 | 1.80518 | 25.4 |
| 25 | | −32.942 | 0.20 | | |
| | IV | | | | |
| 26 | | 2488.937 | 1.00 | 1.83400 | 37.2 |
| 27 | | 23.668 | 6.80 | 1.58913 | 61.0 |
| 28 | | −59.078 | dIV | | |
| 29 | V | 43.954 | 5.80 | 1.56873 | 63.1 |
| 30 | | 160.040 | | | |

|   | f | dI | dII | dIII | dIV | FNo. |
|---|---|---|---|---|---|---|
| T | 104.93 | 30.0 | 3.00 | 5.90 | 32.06 | 4.5 |
| M | 61.48 | 16.5 | 16.5 | 5.50 | 18.96 | 4.0 |
| W | 35.16 | 2.0 | 31.00 | 9.76 | 0.20 | 3.5 |

8. The zoom lens system according to claim 3, which is illustrated by data as follows:

|   | R | d | n | ν |
|---|---|---|---|---|
| 1 | −519.654 | 2.00 | 1.80518 | 25.0 |

-continued

| | | R | d | n | ν |
|---|---|---|---|---|---|
| I | 2 | 179.756 | 6.00 | 1.62230 | 53.2 |
| | 3 | −184.513 | 0.20 | | |
| | 4 | 57.973 | 4.00 | 1.69680 | 55.5 |
| | 5 | 322.429 | dI | | |
| II | 6 | −2191.042 | 1.20 | 1.81600 | 46.6 |
| | 7 | 22.133 | 6.55 | | |
| | 8 | −87.250 | 2.80 | 1.80518 | 25.4 |
| | 9 | −41.868 | 1.20 | 1.81600 | 46.6 |
| | 10 | 1326.117 | 0.20 | | |
| | 11 | 38.360 | 3.00 | 1.80518 | 25.4 |
| | 12 | 94.963 | dII | | |
| III | 13 | 42.106 | 4.50 | 1.62299 | 58.2 |
| | 14 | −22.222 | 1.00 | 1.80518 | 25.4 |
| | 15 | −50.884 | 0.20 | | |
| | 16 | 27.161 | 3.50 | 1.69680 | 55.5 |
| | 17 | −107.726 | 1.75 | | |
| | 18 | 515.712 | 3.00 | 1.80518 | 25.4 |
| | 19 | −31.917 | 1.20 | 1.81600 | 46.6 |
| | 20 | 65.113 | 2.60 | | |
| | 21 | −34.928 | 1.00 | 1.78590 | 44.2 |
| | 22 | 31.051 | dIII | | |
| IV | 23 | −51.728 | 4.00 | 1.71300 | 53.8 |
| | 24 | −26.680 | 1.00 | 1.80518 | 25.4 |
| | 25 | −34.046 | 0.20 | | |
| | 26 | 480.267 | 1.00 | 1.83400 | 37.2 |
| | 27 | 24.973 | 6.80 | 1.58913 | 61.0 |
| | 28 | −55.606 | dIV | | |
| V | 29 | 64.267 | 5.80 | 1.56873 | 63.1 |
| | 30 | −367.464 | | | |

| | f | dI | dII | dIII | dIV | FNo. |
|---|---|---|---|---|---|---|
| T | 104.83 | 30.00 | 3.00 | 5.02 | 32.98 | 4.5 |
| M | 61.38 | 16.50 | 16.50 | 5.00 | 19.50 | 4.0 |
| W | 35.13 | 2.0 | 31.00 | 9.80 | 0.20 | 3.5 |

9. The zoom lens system according to claim 3, which is illustrated by data as follows:

| | | R | d | n | ν |
|---|---|---|---|---|---|
| 1 | 1 | 1546.649 | 2.00 | 1.80518 | 25.0 |
| 2 | | 115.765 | 5.00 | 1.62230 | 53.2 |
| 3 | | −293.700 | 0.20 | | |
| 4 | | 53.459 | 6.00 | 1.69680 | 55.5 |
| 5 | | 241.557 | dI | | |
| 6 | 2 | 384.404 | 1.20 | 1.81600 | 46.6 |
| 7 | | 18.799 | 6.55 | | |
| 8 | | −71.048 | 2.30 | 1.80518 | 25.4 |
| 9 | | −38.523 | 1.20 | 1.81600 | 46.6 |
| 10 | | 24025.370 | 0.20 | | |
| 11 | | 34.507 | 2.50 | 1.80518 | 25.4 |
| 12 | | 90.541 | dII | | |
| 13 | 3 | 42.406 | 4.50 | 1.62299 | 58.2 |
| 14 | | −21.548 | 1.00 | 1.80518 | 25.4 |
| 15 | | −58.909 | 0.20 | | |
| 16 | | 29.656 | 3.00 | 1.69680 | 55.5 |
| 17 | | −112.680 | 3.32 | | |
| 18 | | 5325.193 | 2.50 | 1.80518 | 25.4 |
| 19 | | −29.859 | 1.20 | 1.81600 | 46.6 |
| 20 | | 68.876 | 2.60 | | |
| 21 | | −31.877 | 1.00 | 1.78590 | 44.2 |
| 22 | | 41.754 | dIII | | |
| 23 | 4 | −57.355 | 3.00 | 1.71300 | 53.8 |
| 24 | | −26.480 | 1.00 | 1.80518 | 25.4 |
| 25 | | −29.914 | 0.20 | | |
| 26 | | 268.952 | 1.00 | 1.83400 | 37.2 |
| 27 | | 22.095 | 6.50 | 1.51633 | 64.1 |
| 28 | | −54.400 | dIV | | |
| 29 | 5 | 41.811 | 7.00 | 1.51633 | 64.1 |
| 30 | | 228.144 | | | |

| | f | dI | dII | dIII | dIV | FNo. |
|---|---|---|---|---|---|---|
| T | 104.97 | 30.00 | 6.50 | 5.02 | 28.20 | 4.5 |
| M | 58.72 | 16.50 | 20.29 | 4.74 | 14.70 | 4.0 |
| W | 35.12 | 2.0 | 31.67 | 7.86 | 0.20 | 3.5 |

* * * * *